United States Patent [19]

Conrad

[11] Patent Number: 5,777,414

[45] Date of Patent: Jul. 7, 1998

[54] MAGNETIC BEARING ARRANGEMENT FOR A ROTOR

[75] Inventor: Armin Conrad, Herborn, Germany

[73] Assignee: Balzers-Pfeiffer GmbH, Asslar, Germany

[21] Appl. No.: 694,087

[22] Filed: Aug. 8, 1996

[30] Foreign Application Priority Data

Aug. 8, 1995 [DE] Germany .................. 195 29 038.0

[51] Int. Cl.⁶ ........................................... H02K 7/09
[52] U.S. Cl. ................ 310/90.5; 310/90; 310/68 B
[58] Field of Search ............. 310/90.5, 90, 261, 310/179, 184, 68 B, 254

[56] References Cited

U.S. PATENT DOCUMENTS

| | | | |
|---|---|---|---|
| 4,037,886 | 7/1977 | Boden et al. | 310/90.5 |
| 4,065,189 | 12/1977 | Sikorra | 310/90.5 |
| 4,683,391 | 7/1987 | Higuchi | 310/90.5 |
| 5,126,610 | 6/1992 | Fremerey | 310/90.5 |
| 5,155,402 | 10/1992 | Bichler | 310/90.5 |
| 5,223,758 | 6/1993 | Kataoka et al. | 310/90 |
| 5,302,874 | 4/1994 | Pinkerton | 310/90.5 |
| 5,332,987 | 7/1994 | Hennessey et al. | 335/216 |
| 5,543,673 | 8/1996 | Katsumata et al. | 310/90.5 |

*Primary Examiner*—Steven L. Stephan
*Assistant Examiner*—Michael J. Wallace, Jr.
*Attorney, Agent, or Firm*—Anderson Kill & Olick, P.C.

[57] ABSTRACT

A magnetic bearing arrangement for a rotor of a D.C. electric motor, which is rotated due to cooperation of a permanent magnet provided on the rotor and stator coils, and including a magnetic bearing, and at least one additional coil arrangement provided in a region of the permanent magnet at a side of a stator of the electric motor, and in which a voltage is induced by the rotatable permanent magnet means, with the at least one of the amplitudes and at least one of the phases of the relative geometrical position of the at least one additional coil arrangement and the permanent magnet being used as a sensor signal for stabilizing the magnetic bearing.

7 Claims, 4 Drawing Sheets

MAGNETIC BEARING ARRANGEMENT FOR A ROTOR

BACKGROUND OF THE INVENTION

1. Field of the Invention

The present invention relates to a magnetic bearing arrangement for a rotor of a D.C. electric motor which is rotated due to cooperation of a permanent magnet provided on the rotor and stator coils.

2. Description of the Prior Art

Because of well known advantages of magnetic bearings in comparison with conventional bearings, in particular for supporting rotational members rotatable with a high rotational speed, a large number of different constructions of magnetic bearings is disclosed in the prior art. When it is desired to eliminate a mechanical support, as provided by so-called hybride bearings, and to have a rotor completely and stably suspended in a contactless manner, then an electromagnetic field is used. The control of coils for generating this field is effected by a control unit in dependence on signals of a sensor or sensors which sense(s) a respective position or a change of position of the rotor relative to the stator. The known sensors operate according to optical, induction or capacitance principles. The sensors and the control units substantially contribute to the increase in overall costs of the entire magnetic bearing and, in addition, require extensive constructional modifications.

To reduce these expenses or to eliminate them, a number of different solutions were proposed. However, all of the proposed solutions have serious drawbacks which substantially limit their practical implementation.

European Publication EP 05-94 033 discloses a magnetic bearing in which voltage is induced by eddy currents. The use of induction currents results in an automatic control. Here, a disc formed of an electroconductive material rotates between two systems of paired magnets provided on the stator. The relative movement of an electrical conductor and the magnet induces eddy currents in the electrical conductor. The eddy currents generate a magnetic field which acts as a repellant force between the rotating disc and the magnets provided on the stator. When the disc approaches the magnets, the force of the magnetic field, which is generated by the eddy currents, increases. At a larger distance of the rotating disc from the magnets, the force of the magnetic field decreases. This provides for the automatic regulation of the magnetic bearing system.

The above-described magnetic bearing system can function only at a certain rotational speed as its regulation depends on a relative movement between a conductor and magnets. At standstill, during the start, and at a small rotational speed additional bearing means need be used. Besides, the induction currents are a source of heat, resulting in an unpermissible increase in the disc temperature. Despite some constructional measures (making the disc so thin that currents induced on opposite sides of the disc are neutralized), it prooved to be impossible to reduce the temperature to a degree that would insure a permanent operation.

U.S. Pat. No. 5,302,874 discloses a magnetic bearing system in which the stator is equipped with permanent magnets, and the rotor is provided with closed conductive loops. This bearing system has the same drawbacks as the system of EP 05 94 033.

Another magnetic bearing system is disclosed in U.S. Pat. No. 5,345,128. Here, pairs of magnets with different polarities are mounted on the rotor, with the stator being provided with coils. The deviation of the rotor from its mean position induces currents in the coils which generates a magnetic field. The magnetic force of which has a direction resulting in the centering of the rotor. Because the induced currents are generated in the stator, this system has an advantage which consists in that the generated heat can be removed more easily. The stator coils can simultaneously serve as sensors for the actuation of additional electromagnets. This system can be used for magnetic support at a relatively small rotational speed. The drawback of this system consists in that the magnetic structures provided on the rotor and the stator coil system are rather expensive.

Accordingly, an object of the invention is to provide a magnetic bearing system or arrangement for a freely suspended rotor which is self-stabilized and does not require expensive sensors and control units.

Another object of the invention is to provide a magnetic bearing arrangement for a freely suspended rotor in which the elements of the drive system and the elements of the magnetic bearing cooperate with each other.

SUMMARY OF THE INVENTION

These and other objects of the present invention, which will become apparent hereinafter, are achieved by providing a magnetic bearing arrangement with at least one additional coil arrangement provided in a region of the permanent magnet at a side of a stator of the electric motor, and in which a voltage is induced by the rotatable permanent magnet, with amplitudes and phases which depend on the relative geometrical position of the permanent magnet and the at least one additional coil arrangement, and with at least one of the amplitudes and at least one of the phases being used as a sensor signal for stabilizing the magnetic bearing. The present invention permits to magnetically support a rotor, which is automatically stabilized, without using expensive sensors and control units. The use of drive elements for the evaluation of the deviation of the rotor from its mean position substantially simplifies sensing of this deviation. The use of one or several additional coil arrangements having cooperating separate elements, permits to eliminate expensive control units.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
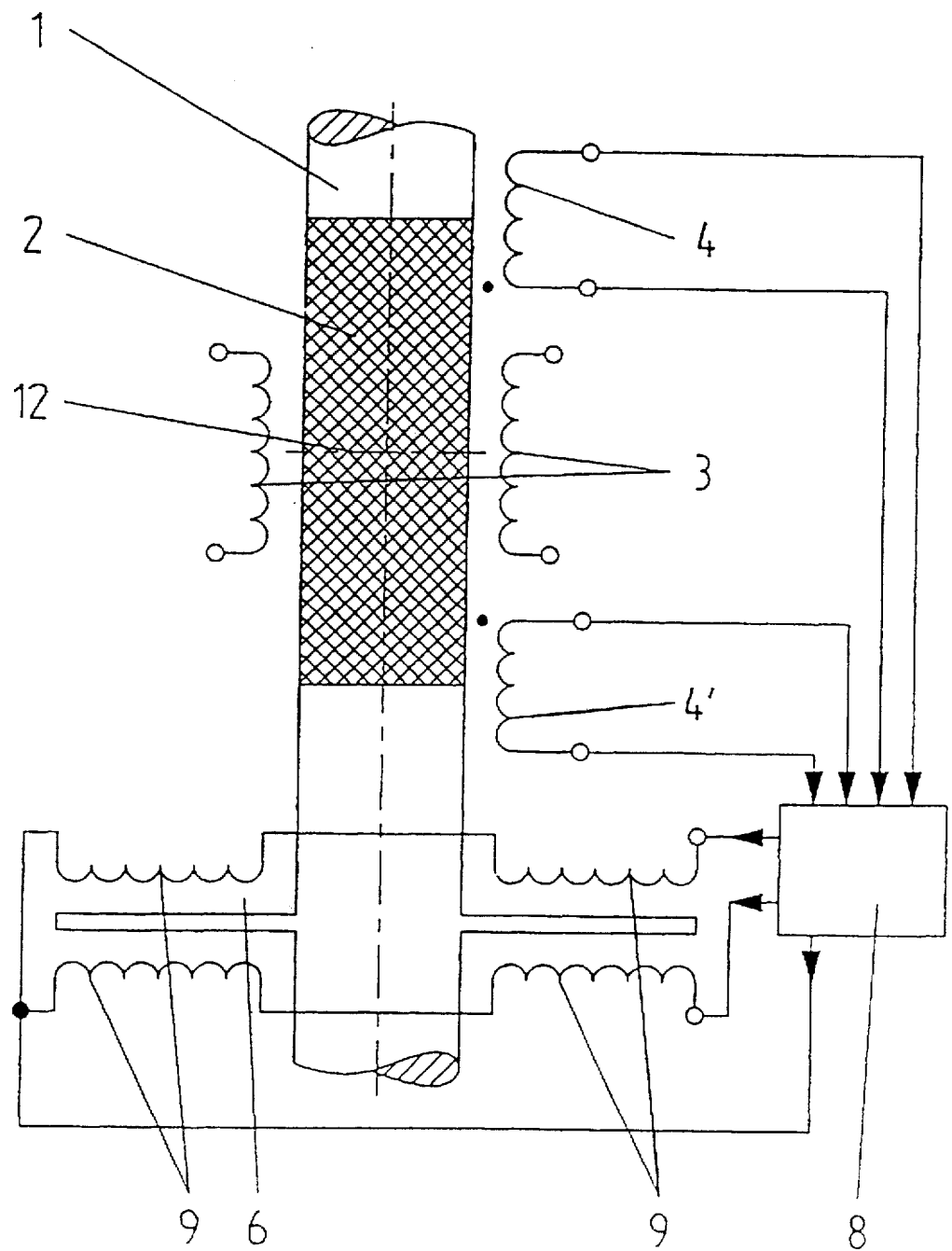
FIG. 1 shows a schematic view of a rotor with a magnetic thrust bearing according to the present invention.
Figure 2:
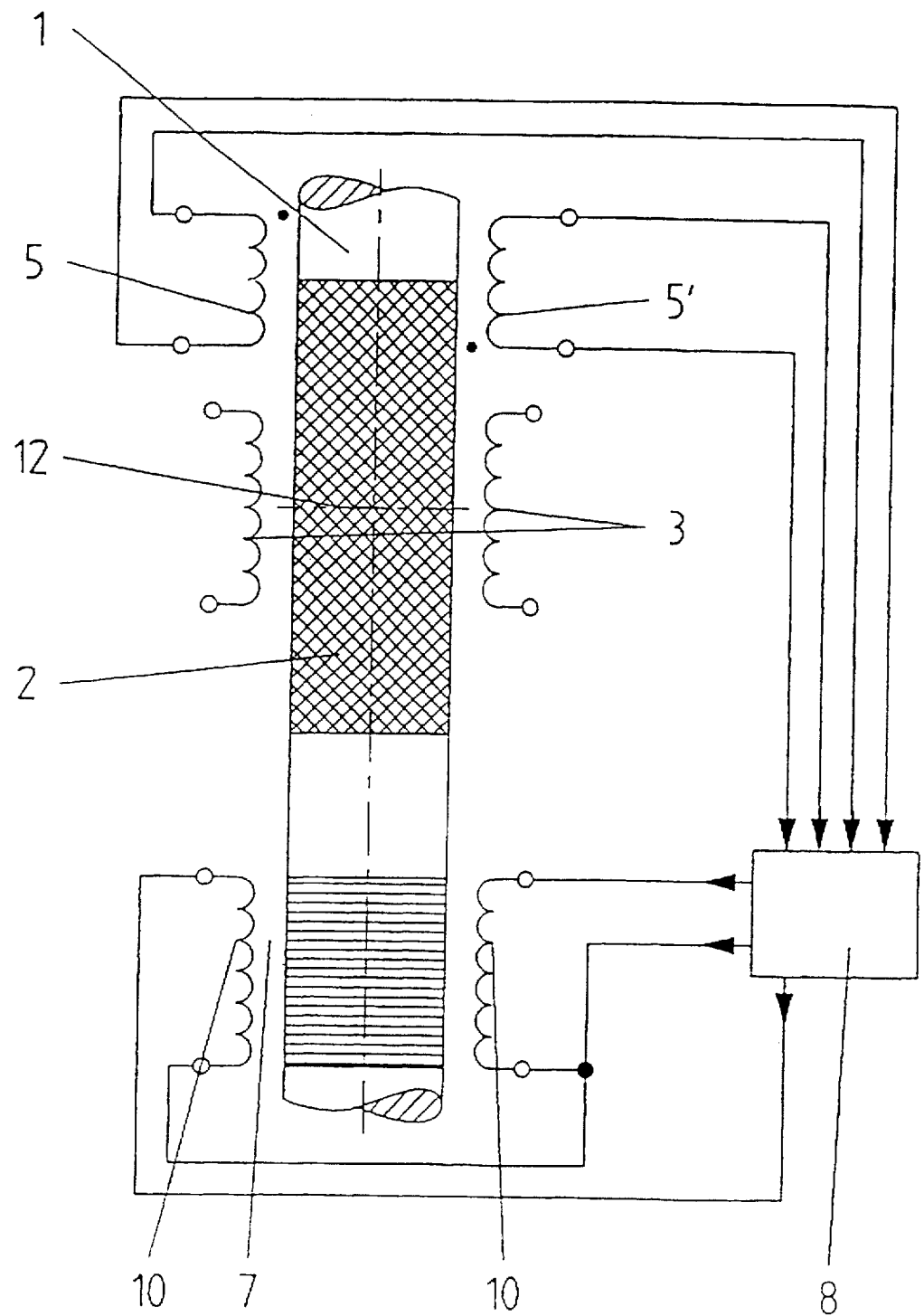
FIG. 2 shows a schematic view of a rotor with a magnetic radial bearing according to the present invention.

FIGS. 1 and 2 show a rotor 1 of an electric motor and which is rotated due to cooperation of a permanent magnet 2, which is mounted on the rotor along a portion of the axial length of the rotor, with stator coils 3. As shown in FIG. 1, the rotor 1 is supported by a magnetic thrust bearing 6 and additional coil arrangements 4,4$^1$ provided on a stator side at axial end regions of the permanent magnet 2 on opposite sides of the stator coil 3. It is important that coil arrangements 4 and 4$^1$ be located at a certain axial distance from each other and at certain distance from the middle 12 of the permanent magnet 2. The rotor 1 extends through a hub of the magnetic bearing 6 and is supported in a predetermined or mean axial position by magnetic fields created by drive coils 9 of the magnetic bearing 6 and by coil arrangements 4, 4'. The bearing supports the rotor 1 in a contactless manner as it is conventional in magnetic bearings. Correspondingly, FIG. 2 shows a magnetic radial bearing 7 and additional coil arrangements 5 and 5$^1$ which are mounted on the stator. The rotor 1 extends between drive coils 10 of the radial bearing 7 and coil arrangements 5, 5' which are located on opposite sides of the rotor 1 and are arranged in a plane extending transverse to the plane in which the coil 9 and coil arrangements 4, 4' are arranged. The phase position of the coil arrangement 4 and the coil arrangement 5 is offset by 180° relative to the phase position of the coil arrangement 4' and the coil arrangement 5', respectively. Therefore, the induced voltages in coil arrangements 4,4' and the induced voltages in coil arrangements 5,5' and 4,4' have opposite signs, i.e., in one of coil arrangements 4,4' and in one of coil arrangements 5,5' the induced voltage has a positive value and in another one of coil arrangements 4,4' and another one of coil arrangements 5,5' has a negative value. The coil arrangements 5,5' are located at the same radial relative to the drive each other and are located at the same radial distance from the set position of the permanent magnet 2 of the rotor 1. An adapter unit 8 transmits the sensor signals from the coil arrangements 4,4$^1$ and 5,5$^1$, respectively, to coils 9 and 10 of the magnet bearings 6 and 7, respectively, to stabilize the coils 9 and 10. The adapter unit 8 can additionally be equipped with active control elements.

Figure 3:
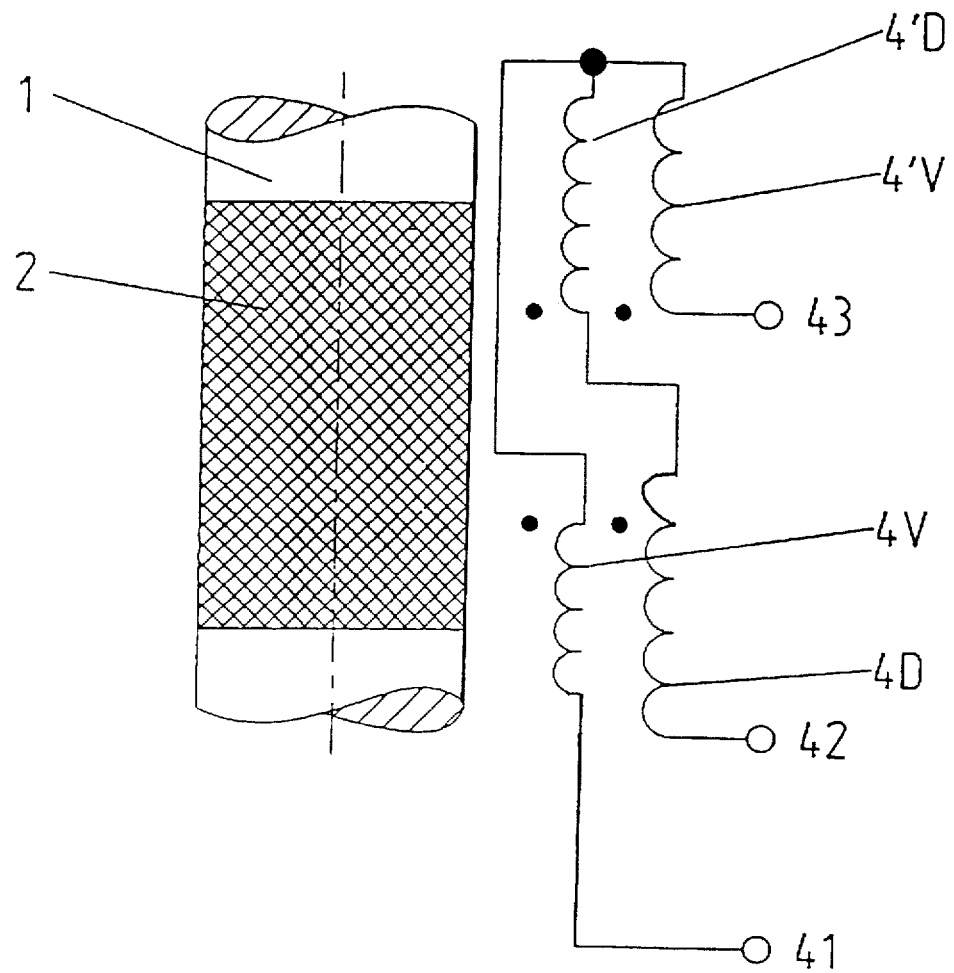
FIG. 3 shows a detailed view of a coil arrangement provided on a stator side of an electric motor in accordance with the present invention and used with the thrust bearing shown in FIG. 1.

FIG. 3 shows how the coil arrangements 4,4$^1$ for the magnetic axial bearing 6 are formed and connected. The coil arrangements 4,4$^1$ consists each of two coils 4D, 4V and 4$^1$D, 4$^1$V, respectively, with the coils having different number of turns. At that, the coils 4D, 4$^1$D and 4V, 4$^1$V have the same number of turns.

When the rotor 1 is located in an axial mean position that is in a symmetrical position with respect to the coil arrangements 4,4$^1$, then the same voltage will be induced in the coils 4D, 4$^1$D and 4V, 4$^1$V. Because of the different number of turns in the coils 4D and 4V and 4$^1$D and 4$^1$V, the induced voltages in these coils will be different.

The coils 4D and 4$^1$D are connected in series so that the voltage in the line with the coils 4D and 4'D equals the sum of voltages induced in coils 4D and 4'D. When the rotor 1 is located in the axial mean position, the differential voltage is zero, the induced voltages in the coils 4D, 4'D having the same absolute value but opposite signs. Upon deviation of the rotor 1 from the mean position, the differential voltage will likewise deviate from zero. The amplitude of this differential voltage is a measure of an absolute magnitude of the axial deviation of the rotor 1. However, this magnitude does not indicate a direction of the deviation of the rotor 1. The direction can only be determined from the phase position of the differential voltage with respect to a reference magnitude. The provision of a phase-sensitive rectifier would permit to determine both the direction of the deviation of the rotor from the mean position and the magnitude of the deviation. However, the use of a phase-sensitive rectifier leads to additional costs associated with a need in additional active structural elements. The present invention permits to eliminate the need in providing a rectifier.

According to the invention, additional the differential voltage is added to voltages induced in coils 4V and 4$^1$V which are phase-offset by 180°. Dependent on the phase position and the direction of the rotor deviation, either a positive value or a negative value is added to the voltages induced in coils 4V and 4'V. As a result, the voltage amplitudes between points 41 and 42 and points 41 and 43 permit to precisely determine the magnitude and direction of the rotor deviation from the mean position.

The obtained signals are used as sensor signals for stabilizing the magnetic bearing 6 the sensor signals are communicated to the adaptor unit 8 that controls the drive coils 9 of the magnetic bearings 6. Dependent on the direction of an axial deviation of the rotor 1, the drive coils 9 operate either to expel the rotor 1 from the thrust magnetic bearing 6 or pull the rotor in. Thereby, the electromagnets of a magnetic bearing can be stabilized without the use of active amplifying elements.

By using a plurality of coil arrangements distributed along a rotor circumference, e.g., by using three coil arrangements offset relative to each other by 120°, e.g., in a three-phase system, the ripple of a rectified sensor signal, which is further processed as a pulsating DC-signal, can be substantially reduced. This permits to reduce power losses, noise and vibrations.

Figure 4:
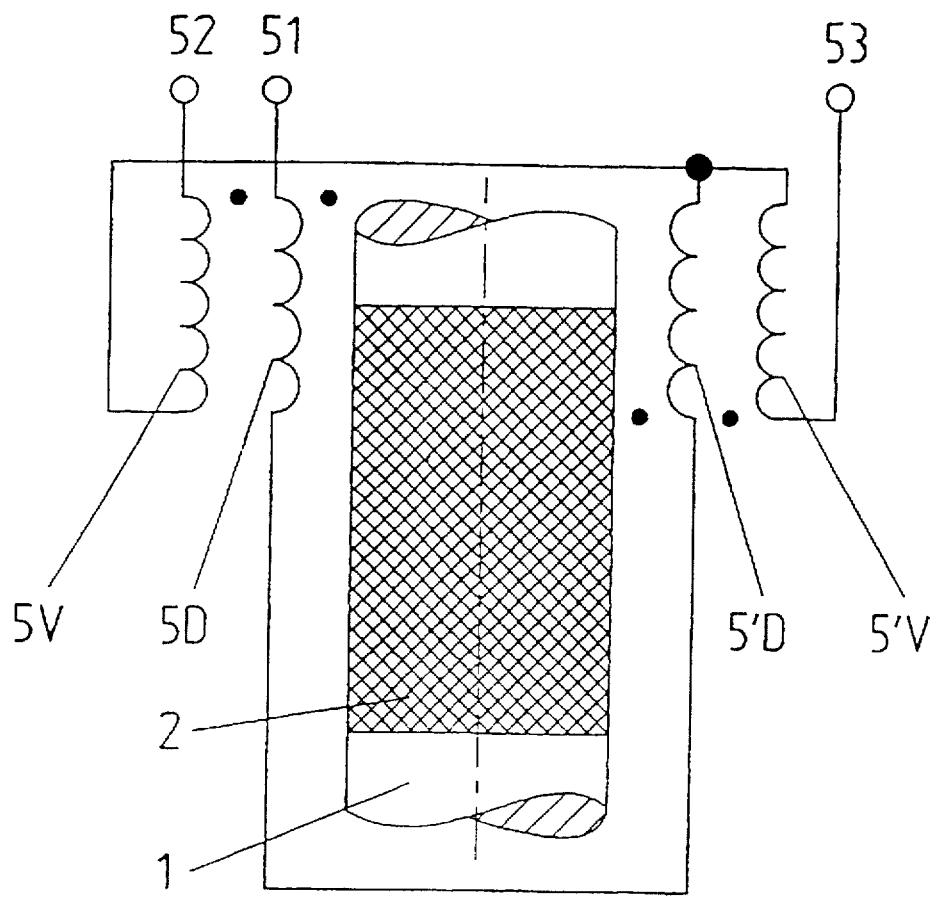
FIG. 4 shows a detailed view of a coil arrangement provided on a stator side of an electric motor in accordance to the present invention and used with the radial bearing shown in FIG. 2.

FIG. 4 shows how the coil arrangements 5 and 5$^1$ for the radial bearing 7, which is shown in FIG. 2, are formed and connected. The coil arrangements 5 and 5$^1$ likewise consist, respectively, of two coils 5D and 5V and 5$^1$D and 5$^1$V having, respectively, different number of turns. As in the coil arrangements 4D,4$^1$D and 4V,4$^1$V, the corresponding coils 5D, 5$^1$D and 5V and 5$^1$V have the same number of turns. The coil arrangements 5 and 5$^1$ function in the same manner as the coil arrangements 4 and 4$^1$.

The voltage amplitudes between points 51 and 52 and 51 and 53 permit to precisely determine the magnitude and the direction of the rotor deviation from its radial mean position.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A magnetic bearing arrangement for a rotor of D.C. electric motor, the rotor having a longitudinal axis, a longitudinal extent defined by axial end surfaces thereof and permanent magnetic means provided along a portion of the longitudinal extent thereof, the rotor being disposed within a stator of the D.C. electric motor having coil means surrounding the portion of the rotor provided with the permanent magnetic means, and the rotor being rotatable due to cooperation of the permanent magnetic means with the stator coil means, the magnetic bearing arrangement comprising:

stationary coil means comprising two coil elements arranged along the rotor on opposite sides of the stator coil means in a spaced relationship with respect to the stator coil means and spaced from a middle of the permanent magnetic means a same predetermined distance; and a thrust magnetic bearing for supporting the rotor and provided in one of said axial end surfaces of the rotor spaced from a respective stationary coil element, wherein at least one of amplitude and phase of voltage, which are induced in the stationary coil means by the permanent magnetic means upon rotation of the rotor, depends on a relative axial position between the stator and the rotor, the at least one of amplitude and phase being used as a sensor signal for stabilizing the thrust magnetic bearing, and wherein the sensor signal is generated upon an axial displacement of the rotor from a predetermined axial position thereof relative to the stator.

2. A magnetic bearing arrangement as set forth in claim 1, wherein each coil arrangement comprises first and second coils having different numbers of turns, and wherein at least the first coils of one coil arrangement and the another coil arrangement have a same number of turns.

3. A magnetic bearing arrangement as set forth in claim 2, wherein the first coils are seriesly connection with each other so that a differential voltage of two first coils equals a difference of voltages induced in the first coils.

4. A magnetic bearing arrangement as set forth in claim 3, wherein a phase position of a second coil of one of the coil arrangements is offset by 180° relative to a phase position of a second coil of another one of the two coil arrangements, and wherein the second coils of the two coil arrangements are connected in series with each other and parallel to respective first coils of the two coil arrangements, whereby the differential voltage is added to voltages induced in the second coils, a magnitude of the differential voltage having, dependent on a direction of axial displacement of the rotor, one of a positive value and a negative value.

5. A magnetic bearing arrangement for a rotor of D.C. electric motor, the rotor having a longitudinal axis, a longitudinal extent defined by axial end surfaces thereof and permanent magnetic means provided along a portion of the longitudinal extent thereof, the rotor being disposed within a stator of the D.C. electric motor having coil means surrounding the portion of the rotor provided with the permanent magnetic means, and the rotor being rotatable due to cooperation of the permanent magnetic means with the stator coil means, the magnetic bearing arrangement comprising:

stationary coil means arranged along the rotor and spaced axially from the stator coil means; and a radial magnetic bearing for supporting the rotor and provided in one of said axial end surfaces of the rotor spaced from both the stationary coil means and the stator coil means, wherein at least one of amplitude and phase of voltage, which is induced in the stationary coil means by the permanent magnetic means upon rotation of the rotor, depends on a relative radial position between the stator and the rotor, the at least one of amplitude and phase being used as a sensor signal for stabilizing the radial magnetic bearing, wherein the stationary coil means comprises two coil elements, wherein each coil element is formed of a first coil and a second coil having different numbers of turns, with the first coils of the two coil elements having a same number of turns and the second coils of the two coil elements having a same number of turns, wherein the sensor signal is generated upon a radial displacement of the rotor from a predetermined radial position thereof relative to the stator.

6. A magnetic bearing arrangement as set forth in claim 5, wherein the first coils of the two coil arrangements are seriesly connected in such a way that a differential voltage equals a difference of voltages induced in the two first coils.

7. A magnetic bearing arrangement as set forth in claim 6, wherein a phase position of a second coil of one of the coil arrangements is offset by 180° relative to a phase position of a second coil of another one of the two coil arrangements, and wherein the second coils of the two coil arrangements are connected in series with each other and parallel to respective first coils of the two coil arrangements, whereby the differential voltage is added to voltages induced in the second coils, a magnitude of the differential voltage having dependent on a direction of a radial displacement of the rotor, one of a positive value and a negative value.

* * * * *